Aug. 6, 1968
J. H. CLAYTON
3,395,805
APPARATUS FOR CONTACTING OR SEPARATING MATERIALS
Filed Dec. 30, 1964
4 Sheets-Sheet 2
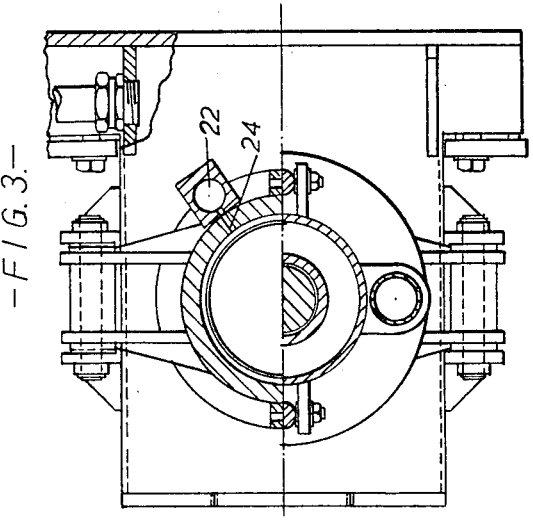
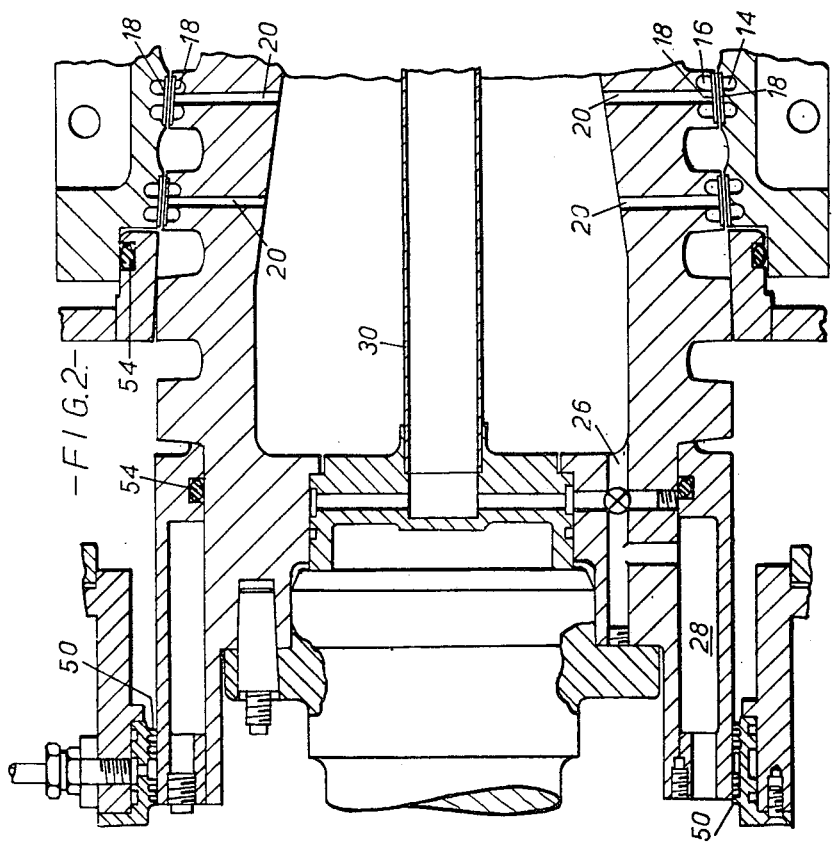
INVENTOR:
JAMES H. CLAYTON
BY
Browne, Schuyler + Beveridge
ATTORNEYS INVENTOR:
JAMES H. CLAYTON
BY
Browne, Schuyler + Beveridge
ATTORNEYS

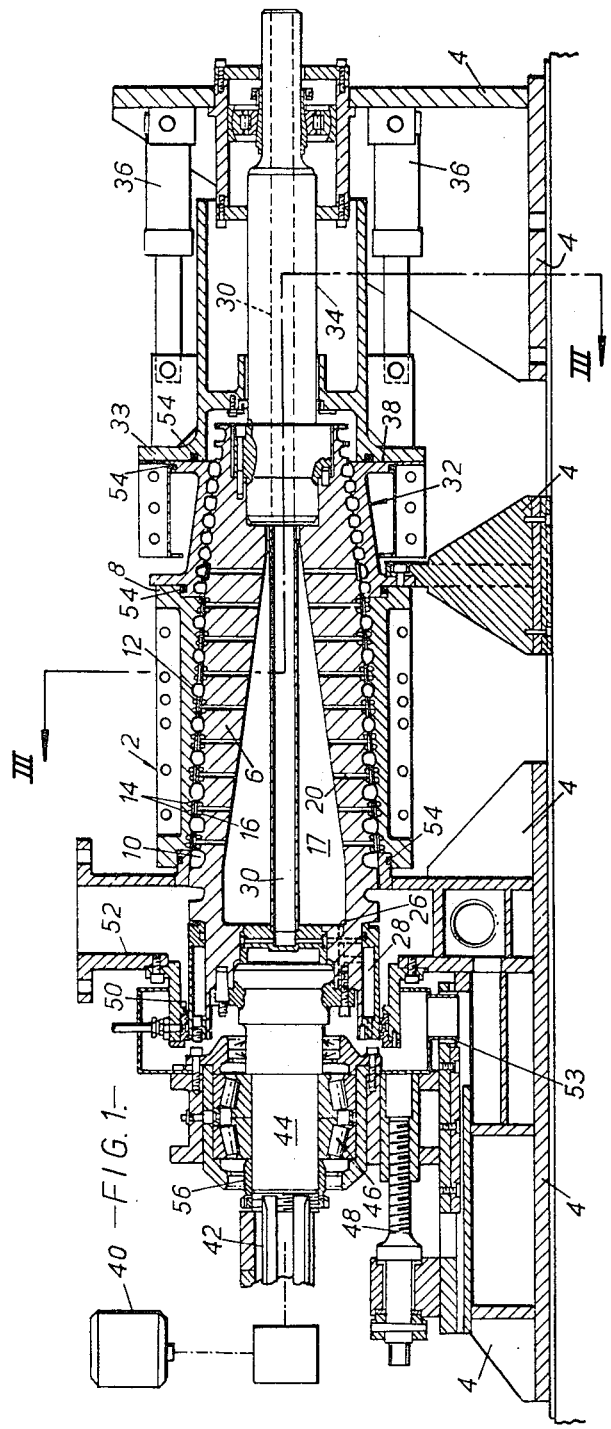

INVENTOR:
JAMES H. CLAYTON
ATTORNEYS

United States Patent Office 3,395,805
Patented Aug. 6, 1968

3,395,805
APPARATUS FOR CONTACTING OR
SEPARATING MATERIALS
James Holden Clayton, London, England, assignor to
G. A. Harvey & Company (London) Limited, London,
England, a British company
Filed Dec. 30, 1964, Ser. No. 422,312
Claims priority, application Great Britain, Jan. 4, 1964,
445/64; Jan. 10, 1964, 1,206/64
13 Claims. (Cl. 210—179)

ABSTRACT OF THE DISCLOSURE

Apparatus for filtering or contacting, having two oppositely tapering grooves in a rotor and stator respectively and porous or foraminous portions in the lands between the grooves, the arrangement being such that thin shavings of flowable material may be squeezed between said portions by the rotation of the rotor, whereby the material may be forced against said faces for the purpose of filtering or contacting.

---

The present invention concerns improvements in or relating to apparatus for contacting or separating materials and also filtration processes especially a method of separating a liquid from a mixture comprising a liquid and a solid. According to the present invention there is provided an apparatus comprising an elongated chamber of annular cross-section at least a portion of at least one wall of which is porous to fluids, means being provided for effecting movement of material longitudinally through said chamber.

According to the invention there is provided an apparatus comprising an elongated chamber of annular cross-section at least one wall of which is porous to fluids, means being provided for effecting movement of material longitudinally through said reaction chamber.

Preferably means are also provided for effecting movement of material in directions other than longitudinal.

Thus one or both of the walls of the chamber may be mounted for rotational movement relative to the other and helical threads and/or grooves formed in the surface of one or both walls of the chamber.

According to one embodiment of the present invention there is provided an apparatus comprising an externally helically threaded worm component mounted coaxially within an internally helically threaded barrel component, the threads of said components being opposite handed for at least a portion of the length of said components and cross sectional areas of at least a portion of the grooves, formed by the respective threads of said components, varying opposite senses between a maximum and a minimum value, at least one portion of one or both of said components being porous so as to allow fluid to pass from the passage defined by co-operation of the threads of said components to a fluid discharge.

Preferably the porous portions are in the form of one or more helixes formed in each of the worm and barrel components.

The worm and barrel components may both be stationary or one or both the components may rotate. The speeds of rotation of one or both components may be fixed or may be made variable. Preferably however the worm component is a rotor and the barrel component a stator.

The construction of the apparatus may be varied in a large number of ways. For example a number of sections in which the cross-sectional areas of the grooves are varied may be provided. The cross-sectional areas of the grooves may be varied by varying the width of said grooves or by varying the depth of said grooves. It is preferred that the depth of the grooves is varied. Preferably, the maximum cross-sectional area is provided by the groove being of the full annular depth of the passage and the minimum cross-sectional area is provided by the groove depth tapering to zero. It is preferred that the cross-sectional areas of such grooves of the worm and barrel components are varied such that the material passing along the passage defined by co-operation of the threads of the worm and barrel components tends to be transferred from the grooves in one component to the grooves in the other component and back again before being discharged from the apparatus. When using such an apparatus it is preferred that, in order to achieve good transportation of a solid, the material ends up in the grooves of the worm component so as to maintain accurate and uniform feeding at the discharge end.

It is also preferred that the clearance between the crowns of the respective threads of the worm component and the barrel component may be adjusted by means of an axial adjustment between the worm component and the barrel component. This adjustment of the clearance may be used to alter the degree of mixing or to influence the nature and thickness of the layer of solids in contact with the porous surfaces or to compensate for wear of the threads or any combination thereof.

The porous portion or portions of the said component or components may comprise part or all of one or both of the crown and/or trough portions of one or both of said worm and barrel components.

If one or more portions of the worm are porous then passage means are provided within said worm component extending between said porous portion or portions and fluid exit or entry means thereto.

If one or more portions of the barrel component are porous then the outer surface of each of said porous portions may be provided with fluid collecting or distributing means for fluid passing through said porous portion or portions. The collecting or distributing means may be separate and distinct or may be in open or controllable communication with one another or arranged in inter-communicating groups or sequences.

The nature of the porous surface may be varied depending on the nature of the constituents to be contacted or separated. For example, if very fine solid particles, which are frequently encountered in industrial processes, are not to be allowed to pass through said porous portions or portion very small pores are employed.

The material used to construct the porous portion or portions of the apparatus may be porous metal, conveniently that marketed by the Pall Corporation of the U.S.A. though other porous metals may be used. It is envisaged that using this porous metal made by Pall Corporation particles of a size of about 1 micron will be retained. Other porous materials may be used, such as synthetic resinous materials or ceramic materials.

Where it is desirable to control the temperature, e.g. when used for a leaching process, where the nature and quantity of material dissolving out may be very sensitive to temperature change, the apparatus of the present invention may be provided with appropriate heating or cooling means, e.g. a heating or cooling jacket fed by steam or oil or refrigerant or electric heating means or any other conventional heating or cooling means may be employed the nature and design of such means being adapted according to the precise function the apparatus is to perform.

If desired the apparatus of the present invention may be constructed so as to produce a reduction of the radius of both the worm and barrel component towards the discharge end. This may result in a reduction of the cross-sectional area of the passage defined by the co-operation of the threads of said components thus effectively producing an increasing compression effect on the mixture as it is transferred along the passage.

The materials used in the construction of the apparatus depend to a large extent on the nature of the materials which are to be contacted or separated in the apparatus but are preferably corrosion resistant and/or abrasion resistant. Alternatively the surfaces of the apparatus which come into contact with the materials passed therethrough may be provided with coatings of materials having these properties.

An important advantage of the apparatus of the present invention is the presentation of the material to be treated to the porous medium in a layer thickness predetermined by the geometry of the chamber, e.g. of the barrel and the worm, where such comprise the chamber. Since the apparatus described above provides a means of constantly presenting a new layer of material to be treated, of predetermined thickness to the porous portion or portions of the apparatus, the rate of separation or contacting of the materials per unit area of the porous surface is very high and greatly exceeds the rates obtainable with prior art apparatus. It is therefore possible to achieve the desired degree of contact or separation over a fairly short distance. A further advantage of the apparatus of the invention is that it may be operated over a wide range of temperature and pressure. Further the temperature and/or the pressure may be kept constant or may be varied. Thus a wide variation in pressure gradient may be achieved culminating in the case of filtration in effective discharge of cake atmospheric pressure.

It is also possible that the apparatus of the present invention may be automatically controlled by presetting the rate of throughput and the pressure.

According to the present invention there is also provided a method of removing liquid from a mixture comprising a solid and a liquid which comprises introducing said mixture into an apparatus comprising an elongated chamber of annular cross section, at least a portion of at least one wall of which is porous to fluids to allow liquid to pass from said passage to a liquid discharge, means being provided for effecting movement of material longitudinally through said chamber, passing said mixture along said chamber and maintaining a pressure differential between said chamber and said liquid discharge whereby liquid from said mixture passes through said porous portions to said liquid discharge.

According to a preferred embodiment of the present invention there is provided a method of removing a liquid from a mixture comprising a solid and a liquid which comprises introducing said mixture into an apparatus comprising an externally helically threaded worm component mounted coaxially within an internally helically threaded barrel component, the threads of said components being opposite handed for at least a portion of the length of said components and cross-sectional areas of at least a portion of the grooves, formed by the respective threads of said components, varying in opposite senses between a maximum and a minimum value, at least one portion of one or both of said components being porous so as to allow liquid to pass from the passage defined by co-operation of the threads of said components to a liquid discharge; passing said mixture along said passage whereby portions of said mixture are transferred between the grooves formed by the respective threads of said components, and maintaining a pressure differential between said passage and said discharge whereby liquid from said mixture passes through said porous portions and is discharged through said discharge.

The apparatus used in the filtration process of the present invention may be varied as described previously in the description of said apparatus.

The process of the present invention may be applied to a wide field of industrial processes wherever it is desired to remove a liquid from a mixture comprising a liquid and a solid e.g. a suspension or slurry.

In the filtration process of the present invention the pressure differential applied across the porous portion or portions is dependent on the particular solid/liquid mixture used and on the degree of filtration required. For many industrial solid/liquid separation processes however it has been found convenient to employ a pressure differential of about 100 p.s.i.g. The apparatus is, however, particularly suited for very high pressure operation and also for those applications where by using a preheated slurry it is possible to increase the filtration rate and therefore the output per unit area to a considerable degree, as a result of the lowering of the viscosity of the liquid component, which in this case may be regarded as the effluent. If desired a number of filter apparatus of the type described above may be employed in series, the filter cake discharging from one being mixed with fresh liquid and the resulting mixture or slurry being fed into the next filter. This procedure is particularly applicable to processes where the solid is the required product e.g. where it is desired to wash said solid to remove occluded soluble material or to processes where it is desired to carry out a counter-current leaching process e.g. in the extraction of a soluble metal from a metal ore. In washing processes the solid material may be washed in a series of stages by one or more liquids which may be the same or different than the original liquid in the solid/liquid mixture.

An important advantage of the process of the present invention is the presentation of the material to be treated to the porous medium in a layer thickness predetermined by the geometry of the chamber, e.g., of the barrel and the worm, where such comprise the chamber. Since the apparatus described above provides a means of constantly presenting a new layer of material to be treated, of predetermined thickness to the porous portion or portions of the apparatus, the rate of separating of the materials per unit area of the porous surface is very high and greatly exceeds the rates obtainable with prior art apparatus. It is therefore possible to achieve the desired degree of separation over a fairly short distance or interval of time. The optimum filtration rate can also be adjusted by the thickness of layer to be treated, this layer being independent of throughput and solely determined by the layer thickness/filtration rate characteristic of the liquid/solid mixture. A further advantage of the process of the present invention is that the apparatus used may be operated over a wide range of temperature and pressure. Further the temperature and/or the pressure may be kept constant or may be varied. Thus a wide variation in pressure gradient may be achieved culminating in the effective discharge of cake at atmospheric pressure.

The present invention will now be further described by way of example with reference to the accompanying drawings in which FIG. 1 shows an apparatus acording to the present invention which may be used for the separation of a liquid from a liquid/solid mixture;

FIG. 2 is a detail of a portion of the apparatus shown in FIG. 1;

FIG. 3 is a section along the line III—III in FIG. 1;

Figure 4:
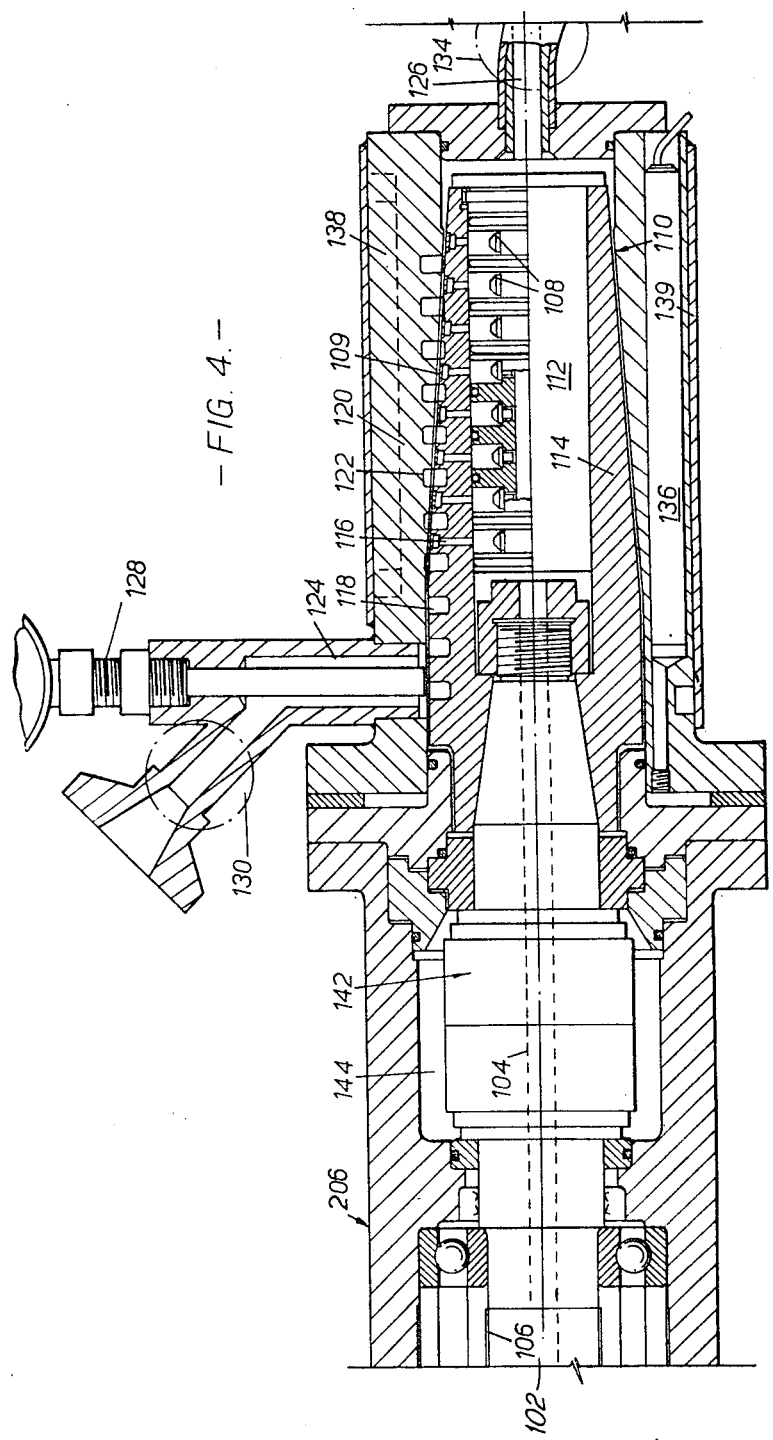
FIG. 4 is an apparatus according to the present invention which may be used for contacting a gas and a liquid or a gas and a liquid/solid mixture.

Referring to FIGS. 1 to 3, the filtration unit shown generally by 2 is mounted on a framework comprising a series of brackets, channel members and angle irons 4, which framework may be bolted to the floor for rigidity. The filtration portion of the apparatus comprises a worm component 6 rotatably mounted coaxially within a barrel component 8, which barrel component is rigidly attached to the framework 4. A helical groove 10 is formed in the rotatable worm component 6 and an opposite handed helical thread 12 is formed in the barrel component 8. A series of helical grooves 14 and 16 are formed in the barrel and worm components respectively. Helical strips of porous metal 18 are mounted over said helical grooves 14 and 16. A series of holes 20 are formed in the worm component 6, connecting the helical grooves 16 to the hollow interior 17 of the worm component 6. The helical grooves formed in the barrel component 8 are connected to a liquid discharge 22 (see FIG. 3) by a series of holes 24 formed in said barrel component 8.

A liquid outlet 26 is formed at one end of the hollow interior 17 of said worm component 6 and may be selectively connected with either liquid discharge 28 or with the hollow central member 30 of worm component 6.

A dynamic pressure gland shown generally at 32 is formed as a continuation of the worm component and barrel component except that no porous metal strips 18 are provided and no holes 20 and 24 are formed in the continuations of worm component 6 and barrel component 8 respectively.

A starter plate 33 is coaxially mounted about the shaft 34 and may be moved between the position shown in FIG. 1 and a position in which the starting plate is not in contact with the end 38 of the barrel component 8 by a pair of power jacks 36.

The worm component is rotated by means of a motor 40 via driving shaft 42 and shaft 44 which is mounted in a bearing arrangement 46.

Axial adjustment of the worm component is possible by turning the screw member 48 which, depending on the direction and rotation, either moves the worm component 6 out of the barrel component 8 or moves the worm component 6 into the barrel component 8 so that adjustment between the crowns of the threads formed in the worm and barrel components is obtained.

A fluid seal is provided at 50 to prevent the mixture entering the filtration apparatus via inlet 52 from escaping into the bearing 46. An outlet for fluid from the fluid seal is provided at 53.

Other seals in the apparatus are either O-rings 54 or oil seals 56.

In operation the starter plate 33 is first moved into the position shown in FIG. 1 by the power jacks 36 and the material to be filtered is introduced into the filter apparatus 2 through inlet 52. The worm component is rotated by means of rotor 40 and the mixture introduced to the filtration apparatus 2 is thus moved along the apparatus towards the starter plate 33 in the channel formed by co-operation of the helical grooves 10 formed in the worm component 6 and the helical grooves 12 formed in the barrel component 8. As the material is moved along the filtration apparatus 2 it is transferred from the helical grooves 10 to the helical grooves 12 owing to the variation in cross-section between a maximum and a minimum of these helical grooves. When pressure within the apparatus has built up to the desired level the starter plate 33 is allowed to move from the position shown in FIG. 1 to a position away from the end 38 of the barrel component 8 by reducing the pressure of the power jacks holding it in position.

Liquid from the mixture passes through the porous metal strips 18 via holes 20 to outlet 26 and via holes 24 to liquid discharge 22. From outlet 26 the liquid may be directed either into liquid discharge 28, from where it is passed to the fluid outlet 53 or it is passed into shaft 30 and removed from the end of shaft 34. In order to remove liquid by this second means suction has to be applied at the end of shaft 34. If the liquid removed from the mixture and the fluid used in fluid seal 50 are not further required the filtrate (i.e. liquid from the mixture) is allowed to pass from the centre of the worm component 6 through outlet 26 and discharge 28 to join with the fluid from the fluid seal and is discharged through outlet 53. If however, it is required to keep the fluid and the liquid separate, the filtrate should be removed by applying suction to the end of shaft 34, thus removing the filtrate via the shaft member 30. The solid from the solid/liquid mixture passes right along the filtration apparatus and is discharged through the space left by starting plate 33 having moved to its position away from the end 38 to barrel component 8.

Referring to FIG. 4, which shows an apparatus suitable for contacting a gas and a liquid or a gas and a liquid/solid mixture, the apparatus comprises a gas inlet 102 communicating with a gas passage 104 formed in driving shaft 106. The gas passage 104 communicates at its other end with a series of gas jets 108 formed in a rotatable worm component 110. Worm component 110 comprises central member 112 in which the gas jets are mounted and a nose portion 114 in which are formed a number of holes 116 communicating with said gas jets 108. The central member 112 is detachably mounted within nose portion 114. The ends of holes 116 remote from the ends communicating with gas jets 108 are covered by a helical porous strip of stainless steel. A helical groove 118 is formed in the nose portion 114 of worm component 110. The worm component 110 is coaxially mounted within the barrel component 120 in which a helical groove 122 is formed. The cross-sectional areas of the helical grooves 118 and 122 vary in opposite senses between a maximum and a minimum.

A liquid inlet 124 is provided at one end of the barrel component 120 and an outlet 126 is provided at the opposite end of the barrel component 120. A temperature gauge or thermocouple unit 128 and a sampling point needle valve 130 are provided at the liquid inlet 124 and a temperature gauge or thermocouple unit 132 and a sampling point needle valve 134 are provided at the outlet 126.

A series of cartridge heater elements 136 and a series of moulded slots 138 for a coolant liquid are provided in the barrel component 120. The contacting portion of the apparatus is lagged by lagging means 139.

The worm component is driven via shaft 106 by a timing belt pulley drive 140 which is in turn driven by a motor (not shown), e.g. a 5 H.P. geared motor. The drive shaft 106 is sealed against egress of gas and liquid by a rotating face seal 142, a space 144 being provided for circulation of a cooling fluid.

For operating convenience the assembly can be mounted on a mobile structure having jacks (not shown) to raise and level the system during use.

In operation gas enters the rotary inlet 102 and passes along gas passage 104 through gas jets 108 and porous strip 109 into the passage formed by co-operation of helical grooves 118 and 122. Liquid or a liquid/solid mixture enters the apparatus via inlet 124 and is passed from the inlet end of the apparatus to the discharge end by means of the helical grooves 118 and 122. During the passage of the liquid or liquid/solid mixture through the apparatus it is transferred from the helical grooves 118 formed in the worm component 110 to the helical grooves 122 formed in the barrel component 120 and is at the same time thoroughly permeated by the gas entering the apparatus via porous strips 109. The product of the contacting process is discharged through outlet 126 to a storage tank (not shown) or to a further processing plant (again not shown).

Figure 5:
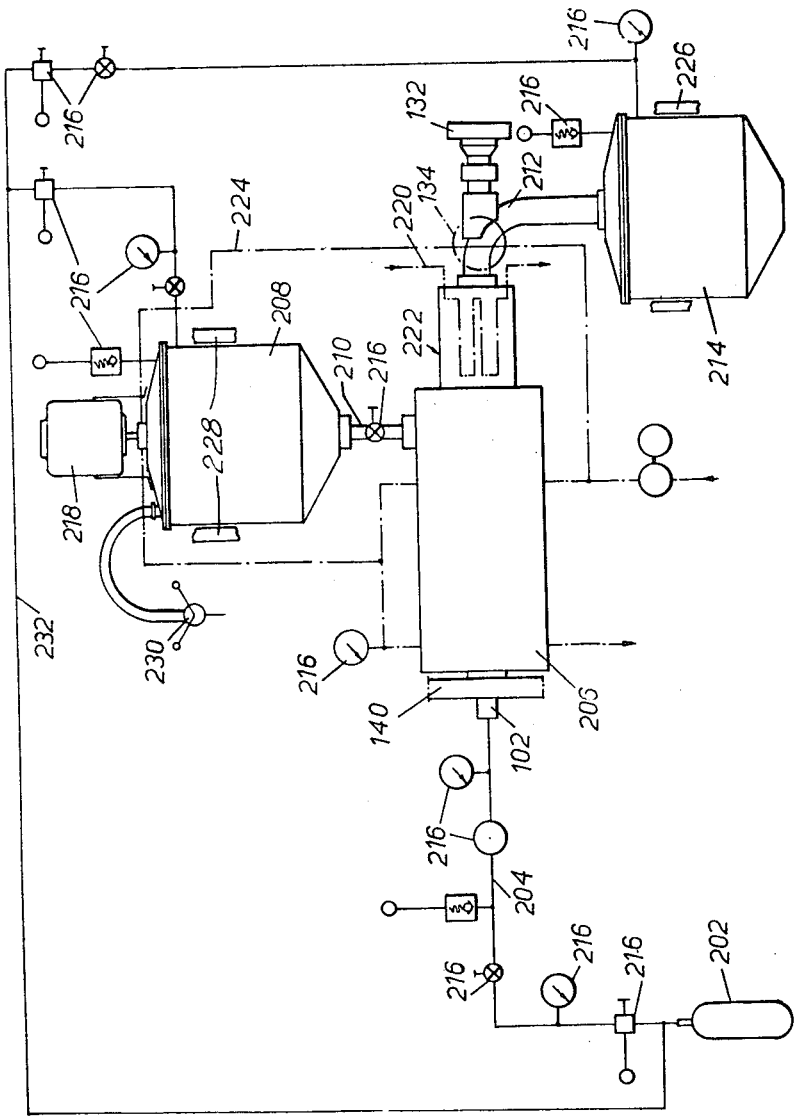
FIG. 5 is a flow diagram illustrating one form of contacting assembly incorporating the contacting apparatus of the present invention.

Referring to FIG. 5, the assembly illustrated for contacting a gas with a liquid or a liquid/solid mixture comprises a pressure gas supply 202, a contactor apparatus 206, a liquid or liquid/solid mixture reservoir 208, conduit means 210 connecting said reservoir 208 to the contactor apparatus 206 and conduit means 212 connecting the discharge end of the contactor apparatus 206 to a product container 214. Pressure gauges, temperature gauges, flow meters, pressure reducing valves, relief valves and stop valves 216 are provided at various points in the system to enable the contacting process to be controlled within predetermined limits. A mixer (not shown) driven by motor 218 is provided to mix the contents of the reservoir 208 prior to introduction into the contactor apparatus 206. Two cooling systems are provided, one shown by chain dotted line 220 for cooling the contacting portion 222 of the contacting apparatus 206 and the other shown by chain dotted line 224 for cooling the seal 142 as described in connection with FIG. 4. In cooling system 224 to prevent the cooling water carrying adsorbed reaction gas to the drains, a small, sealed settling tank may be included in the system, and any liberated gas should be suitably disposed of.

Heater muffs 226 and 228 are provided for heating the contents of the product container 214 and the reservoir 208 respectively, if desired. A hand pump 230 is provided for filling the reservoir 208.

In operation gas from pressure container 202 is passed through pressure reducing valve 216 in conduit 204 and is metered into a contactor apparatus 206. Simultaneously liquid or liquid/solid mixture from reservoir 208 is fed via conduit 210 into the contactor apparatus 206. The product of the contacting process, which takes place in the contacting portion 222 of the contacting apparatus 206 which has been previously described in connection with FIG. 4, is passed via conduit 212 into the product container 214. The reservoir 208 and the product container 214 are pressurised by a suitable gas, e.g. from the pressure supply 202 via conduit 232. During the contacting operation water is fed through coolant system 224 and, if desired, also through coolant system 220. Relative pressures between the inlet and outlet stages of the contactor will be initially set manually, and during the reaction maintained automatically by a suitable differential pressure controller arrangement. Drive is by a timing belt and pulley from a motor (not shown), e.g. a 5 H.P. geared motor. Speed changes may be effected by fitting alternative pulleys.

The flow diagram illustrated in FIG. 5 is especially useful for reaction of hydrogen with a glucose solution or for the reaction of carbon dioxide with sodium phenol solution. For each of these processes a pressure of 250 lbs. per square inch and a temperature of 250° C. may be maintained. A product throughput of approximately 10 lbs. per hour (specific gravity between 0.6 and 1.2) is maintained.

I claim:
1. Apparatus having
   (a) an outer member having a bore,
   (b) an inner member within the bore and coaxial therewith, said inner member having a hollow center,
   (c) means to support the inner member in the bore for relative rotation about the axis of the bore,
   (d) at least one continuous groove extending along the inner surface of the bore of the outer member,
   (e) at least one continuous groove extending along the outer surface of the inner member,
   (f) a fluid inlet conduit leading to one of said continuous grooves,
   (g) the cross-sectional area of the groove in one member increasing axially in one direction and the cross-sectional area of the groove in the other member increasing axially in the other direction,
   (h) the groove in at least one of the members being helical,
   (i) the parts of the surfaces of the inner and outer members between the grooves lying as viewed in cross-section in circles concentric with the axis of the bore and there being clearance between said parts,
   (j) the said parts of the inner member having at least one porous portion, and,
   (k) a filtrate discharge conduit leading from said porous portion to the hollow center of the inner member.

2. Apparatus as claimed in claim 1 in which the grooves in both of the members are helical.

3. Apparatus as claimed in claim 2 in which the helices of the grooves in the two members are of opposite hands respectively.

4. Apparatus as claimed in claim 1 in which the outer member is formed on its inner surface with a female screw thread and the inner member is formed on its outer surface with a male screw thread, the crests of the screw threads forming the said parts of the surfaces between the grooves.

5. Apparatus as claimed in claim 4 in which the crests of the screw threads are provided with porous portions.

6. Apparatus as claimed in claim 4 in which the variation in the cross-sectional area of the grooves is provided by forming the crests of the screw threads with mating tapers and providing the roots of the screw threads with constant diameters.

7. Apparatus as claimed in claim 1 including means to adjust the clearance between the ungrooved portions of the bore and the outer surface of the inner member.

8. Apparatus as claimed in claim 7 in which the means to adjust the said clearance comprises means to adjust the inner and outer members relatively to one another.

9. Apparatus as claimed in claim 1, in which the porous portions are made of porous metal.

10. Apparatus as claimed in claim 1 in which there is means to apply heat to the bore.

11. Apparatus as claimed in claim 1 in which there is means to cool the bore.

12. Apparatus as claimed in claim 1 in which there is means to apply heat to one part of the bore, and means to cool another part of the bore spaced axially from the said one part of the bore.

13. Apparatus as claimed in claim 1 in which there are at or near one end of the outer and inner members continuous helical grooves in the bore and the outer surface of the inner member and the parts between the said grooves are permeable.

References Cited
UNITED STATES PATENTS

| | | | |
|---|---|---|---|
| 1,227,983 | 5/1917 | Vallez | 210—398 X |
| 2,292,990 | 8/1942 | Chatain | 210—78 |
| 2,439,463 | 4/1948 | Gebauer | 210—179 |
| 2,462,098 | 2/1949 | Hertrich | 210—78 |
| 2,560,142 | 7/1951 | Tucker | 210—398 X |

REUBEN FRIEDMAN, *Primary Examiner.*

J. ADEE, *Assistant Examiner.*